(12) United States Patent
Wen

(10) Patent No.: US 6,911,970 B2
(45) Date of Patent: Jun. 28, 2005

(54) KEYPAD APPARATUS AND METHOD FOR INPUTTING DATA AND CHARACTERS FOR A COMPUTING DEVICE OR CELLULAR PHONE

(76) Inventor: Tai Chun Wen, 2350 Mission College Blvd., #450, Santa Clara, CA (US) 92054

( * ) Notice: Subject to any disclaimer, the term of this patent is extended or adjusted under 35 U.S.C. 154(b) by 277 days.

(21) Appl. No.: 10/109,941

(22) Filed: Mar. 29, 2002

(65) Prior Publication Data

US 2002/0140679 A1 Oct. 3, 2002

(51) Int. Cl.[7] .................................................. G09G 5/00
(52) U.S. Cl. ........................................ 345/168; 400/485
(58) Field of Search .............................. 345/168–172; 235/145 R, 146, 145 A; 341/24, 26, 29–30; 340/407.1, 407.2; 400/480, 485

(56) References Cited

U.S. PATENT DOCUMENTS

| | | | | |
|---|---|---|---|---|
| 4,029,915 A | * | 6/1977 | Ojima | .......................... 708/145 |
| 4,775,255 A | * | 10/1988 | Langley | ........................ 400/485 |
| 5,528,235 A | * | 6/1996 | Lin et al. | ........................ 341/22 |
| 5,627,566 A | * | 5/1997 | Litschel | ........................ 345/168 |
| 6,532,003 B2 | * | 3/2003 | Nagao | ........................... 345/168 |
| 2001/0006587 A1 | * | 7/2001 | Keinonen et al. | ............. 400/472 |

* cited by examiner

Primary Examiner—Dennis-Doon Chow
Assistant Examiner—Leland R. Jorgensen
(74) Attorney, Agent, or Firm—Donn K. Harms

(57) ABSTRACT

A keypad and key device featuring a plurality of contacts on the rear face of a keypad key that each mate with an individual contact pad from a plurality of contact pads placed below the upwardly biased and tiltable keys. Pushing a key on a right side or left side mates different pairs of contacts and contact pads generating different characters for input to a cellular phone or small computer. Pushing the key in the center will generate a third character by mating both contacts with both contact pads. The keys may also have more than two contacts mating with more than two contact pads and tilt to a variety of positions to mate the respective contacts with contact pads. Consequently, one depression of a key enables any one of a plurality of characters assigned thereto to be inputted which is effective in accelerating a data inputting process.

9 Claims, 14 Drawing Sheets

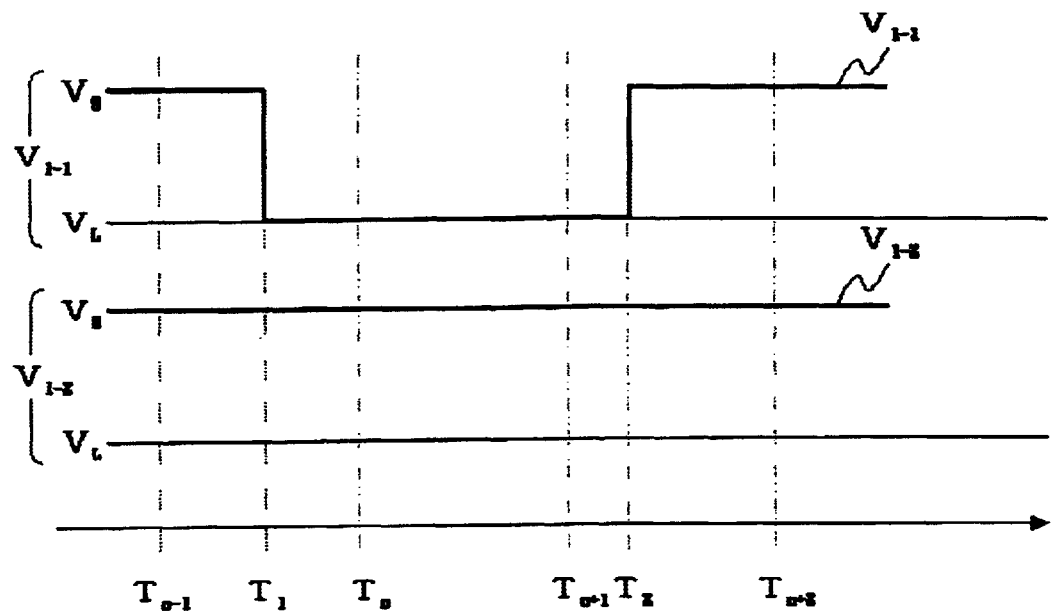
FIG. 3a
| | $T_{n-1}$ | $T_n$ | $T_{n+1}$ | $T_{n+2}$ |
|---|---|---|---|---|
| $V_{1-1}$ | $V_H$ | $V_L$ | $V_L$ | $V_H$ |
| $V_{1-2}$ | $V_H$ | $V_H$ | $V_H$ | $V_H$ |
FIG. 3b
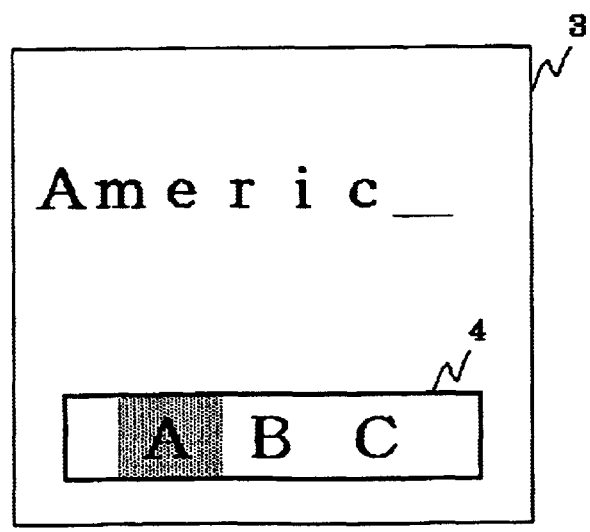
FIG. 3c

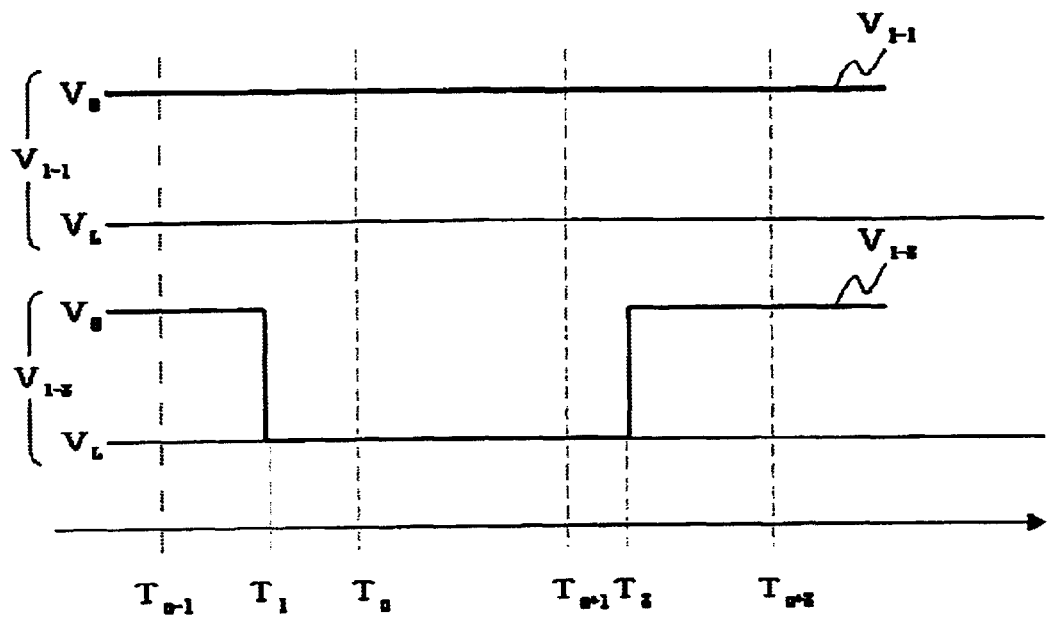
FIG. 4a
| | $T_{n-1}$ | $T_n$ | $T_{n+1}$ | $T_{n+2}$ |
|---|---|---|---|---|
| $V_{1-1}$ | $V_H$ | $V_H$ | $V_H$ | $V_H$ |
| $V_{1-2}$ | $V_H$ | $V_L$ | $V_L$ | $V_H$ |
FIG. 4b
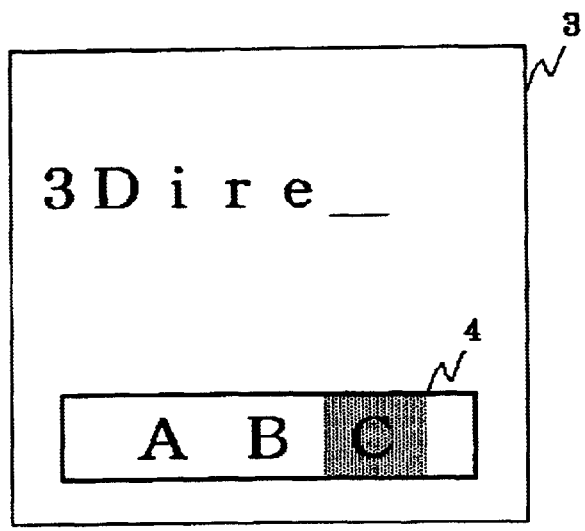
FIG. 4c

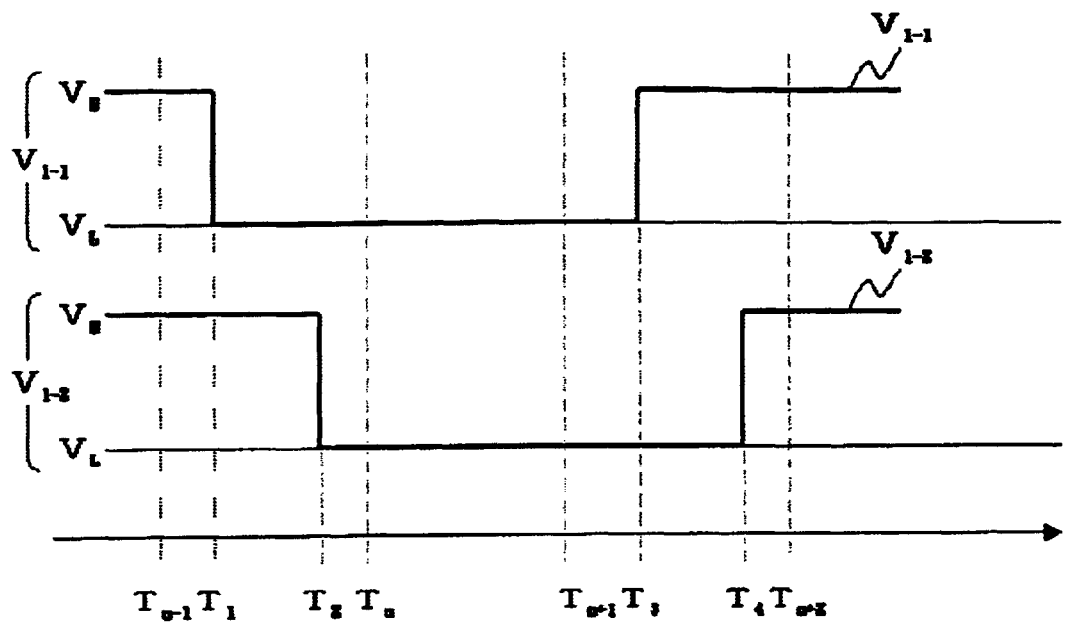
FIG. 5a
| | $T_{n-1}$ | $T_n$ | $T_{n+1}$ | $T_{n+2}$ |
|---|---|---|---|---|
| $V_{l-1}$ | $V_H$ | $V_L$ | $V_L$ | $V_H$ |
| $V_{l-2}$ | $V_H$ | $V_L$ | $V_L$ | $V_H$ |
FIG. 5b
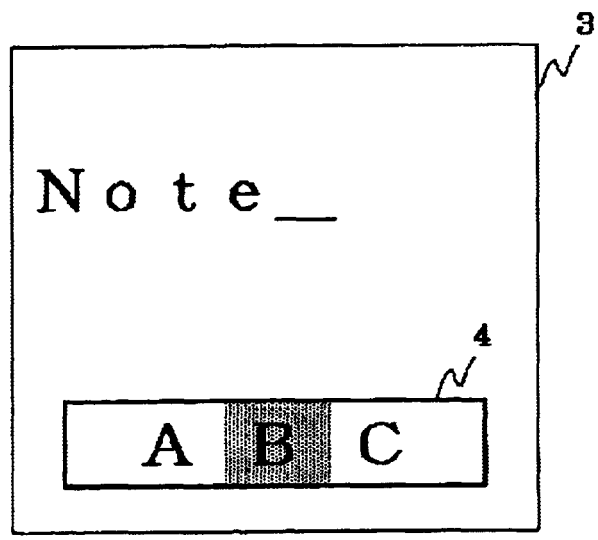
FIG. 5c

| | $T_{n-1}$ | $T_n$ | $T_{n+1}$ | $T_{n+2}$ | $T_{n+3}$ |
|---|---|---|---|---|---|
| $V_{1-1}$ | $V_H$ | $V_L$ | $V_L$ | $V_H$ | $V_H$ |
| $V_{1-2}$ | $V_H$ | $V_H$ | $V_L$ | $V_L$ | $V_H$ |

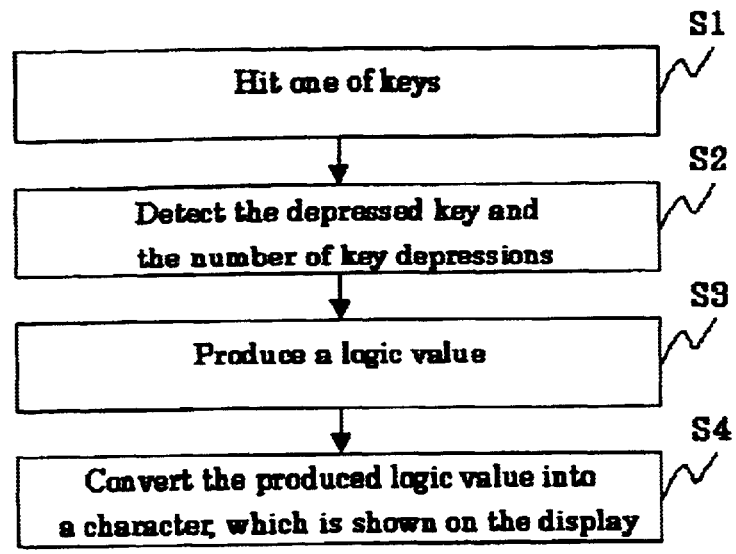
FIG. 14
(Prior Art)
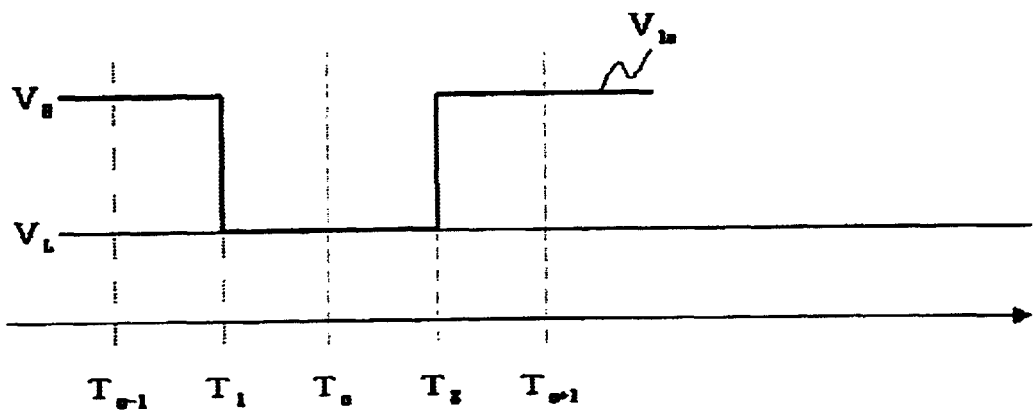
FIG. 15a
(Prior Art)
FIG. 15b
(Prior Art)

KEYPAD APPARATUS AND METHOD FOR INPUTTING DATA AND CHARACTERS FOR A COMPUTING DEVICE OR CELLULAR PHONE

BACKGROUND OF THE INVENTION

1. Field of the Invention

This application claims the benefit of Japanese Patent Application No. 2001-104284 filed on Apr. 3, 2001. This invention relates to a device and a method for inputting data by depressing keys on a keyboard. More particularly it relates to a keyboard data inputting device with individual keys to which a plurality different characters or input data are assigned for use with a cellular phone, hand held or other computer which uses the data inputting device, and a to a method of inputting characters for such electornic devices attached to the keyboard inputting device.

2. Prior Art

With ever widening use and popularity of communication networks such as Internet, an ever increasing number of users enjoy communication network services like the World Wide Web and and e-mail services. Recently, cellular phones with data inputting functions have been extensively used for transmission and reception of data and messages over such networks in addition to information processing terminals as personal information managers and hand held computers.

A typical cellular phone is shown in FIG. 11, of the accompanying drawings, which features a front elevation of a conventional cellular phone 10a. The cellular phone 10a comprises a keyboard 1a and a visual display 3a on its front surface, and a key depression detector and a logic value generator (both of which are housed therein and not shown) communicating between the keyboard 1a and the display 3a. In use on a network or when gaining access to a Web site or sending an e-mail, a user hits keys on the keyboard 1a in order to enter data, which is then translated according to the key hit by the logic value generator and indicated on the display 3a.

Conventionally, a plurality of keys is arranged on the keyboard 1a also shown in FIG. 12(a). Specifically, nine keys B1a to B9a are present on the keyboard 1a. In using the keyboard 1a to enter data to the cell phone, the user can enter a total of 27 characters, i.e., alphabets A to Z, and a dot (.) by hitting the appropriate keys. Each key corresponds to three characters, which are engraved thereon. For instance, the key B1a corresponds to "A", "B" and "C".

A printed circuit board is housed in the cellular phone 10a and is positioned on the rear surface of the keyboard 1a. Contact pads P1a to P9a are arranged on the printed circuit board 2a. The keys B1a to B9a are positioned for registered engagement with the contact pads P1a to P9a on one-to-one basis, for example, the contact pads P1a to P9a are positioned in line and to the rear of the keys B1a to B9a, respectively.

The keys B1a to B9a have individual contacts C1a to C9a on their rear surfaces facing the printed circuit board 2a. The contacts C1a to C9a are substantially in parallel and in line with the contact pads P1a to P9a. When each individual key is depressed, each contact touches each contact pad on the printed circuit board 2a.

FIG. 13(a) is a side elevation of a key on the keyboard 1a, showing that the key B1a biased away from and not depressed and therefor having its contact C1a being out of contact from the contact pad P1a. Conversely, FIG. 13(b) shows that the key B1a is depressed and has its contact C1a being in contact with the contact pad P1a.

Conventionally, three characters are assigned to each key, and can be entered by hitting each individual key once, twice or three times to choose the letter or character desired. For example, the key B1a is hit once, twice and three times in order to enter the characters "A", "B" and "C", respectively, into the cell phone and onto the display.

FIG. 14 shows the sequence and method conventionally used for entering characters on the cellular phone 10a. The user hits one of the keys on the keyboard 1a in a first step. The key depression detector detects a depressed key and the number of key depressions (step S2). The logic value generator produces a logic value in accordance with the number of key depressions (step S3). A converter of the cellular phone 10a converts the produced logic value into a character, which is shown on the display 3a (step S4).

The key depression detector detects communication of the contact and the contact pad and the number of key operations by periodically scanning a potential which varies each time a certain contact is touched to or detached from a certain contact pad.

Referring to FIG. 15(a), a potential V1a varies each time the contact C1a is touched to or detached from the contact pad P1a. The potential V1a is VH when the contact C1a is away from the contact pad P1a, when the key B1a is not depressed. Further, the potential V1a is VL when the contact C1a is depressed and communicates with the contact pad P1a, when the key B1a is depressed. The potential V1a is scanned at times Tn−1, Tn and Tn+1. There is the relation of Tn+1−Tn=Tn−Tn−1. When the contact C1a is touched to the contact pad P1a at the time T1 and is detached therefrom at the time T2, the key B1a remains depressed from the time T1 till the time T2.

FIG. 15(b) is a graph showing variations of the potential V1a scanned by the key depression detector, which electrically communicates with and which detects that the key B1a is operated once. When the key B1a is repeatedly depressed, the potential V1a varies from VH to VL to VH in accordance with the number of key depressions, which enables the key depression detector to detect the number of key depressions. The key depression detector resets the number of key depressions back to zero when the user hits an additional key on the keyboard 1a (such as an Enter key) in order to approve and enter the character corresponding to the logic value. Thereafter, the key depression detector detects one key depression for another new character when the same key is depressed.

However, since cellular phones are developing to be more compact, and a contact pad must be proportionally compact, this can inevitably lead to a reduction in the number of keys. As a result, each key should be able to be used to enter a plurality of different characters; for example, the key would be hit a plurality of times by a user in order to enter one desired character. Consequently, it takes more time to enter the user-desired characters.

The device herein disclosed is contemplated in order to overcome the foregoing problems of prior art, and provides a data inputting device for entering one character of data by hitting a key once to enter a plurality of different characters and data. Consequently, a cellular phone which uses the data inputting device, and a method of inputting characters for the cellular phone herein described and disclosed will more easily be able to enter the characters and other data required for both dialing the phone as well as sending messages and entering data.

SUMMARY OF THE INVENTION

Applicant's device and method yield an improved component and method of entering characters and data using a keypad which interfaces with a cellular phone or similar computing device with minimum area useable for the keypad due to its small size.

According to a first embodiment of the disclosed device, there is provided a data inputting device in the form of a keyboard. The keyboard features a plurality of keys biased upward and tiltable and with a plurality of individual contacts attached to the rear of the keys. In position for registered communication with the plurality of contacts on the individual keys are a plurality of contact pads each of which corresponds to each key and comes into contact with each contact positioned on the rear of that individual key. A key depression detector detects key depression when a key is depressed once and at least one contact thereof is touched to at least one corresponding contact pad. Communicating with the key depression detector is a logic value generator which produces a logic value on the basis of the one or plurality of contacts brought into contact with the registered contact pads, wherein data corresponding to the logic value is inputted to the cell phone or small computing device.

In a second embodiment of the disclosed device, there is provided a keyboard for a cellular phone or similar small computing device with limited space. This second embodiment provides a data inputting device featuring a plurality of keys. Each such key has a plurality of contacts attached at the rear surface of each key. Positioned for registered engagement with each such contact on the keys is a plurality of contact pads each of which corresponds to each key and comes into contact with each contact on the key respectively. During use., a key depression detector detects a key depression when a key is depressed once and at least one contact thereof is touched to at least one contact pad. The logic value generator which is in communication with the contact pads produces a logic value on the basis of which and how many of the contact pads are brought into contact with contacts on the individual key, wherein data corresponding to the logic value are inputted to the cellular phone or hand-held computer.

In another preferred embodiment of the device, there is provided a method of inputting data to a cellular phone or small computer from the depression of individual keys. First, a key depression is detected a key is depressed and at least one contact thereof is touched to at least one corresponding contact pad. Second, a logic value is produced for any one of three characters assigned to the depressed key, whereby data corresponding to the logic value is inputted.

In another preferred embodiment of the disclosed device, there is provided a method of inputting characters to a cellular phone or other device with limited space for a keypad which follows the steps of depressing a key on the data inputting device which in this case is a keypad. Then a depression detector in communication with the contact pads detects a key depression when the key is depressed and at least one contact located on that key communicates to at least one corresponding contact pad. Then, a logic value generator in communication with the depression detector produces a log value for a character from a library of individual log values assigned to the keys and which was assigned to the depressed key and connecting contact and contact pad. Next, from a library of data corresponding to individual log values, the logic value generator inputs data corresponding to the log value generated by the depressed key. Finally, the inputted character is displayed on the data display of the cellular phone or small computing device.

It is an object of this invention to provide a keypad that while small in dimension, allows the user to easily input a plurality of characters or other data using only one stroke of one key.

Another objective of this invention is to provide such a device that will allow the user quicker input of data to a cellular phone or small computer by minimizing the number of keys and strokes needed to enter data.

An additional objective of this invention is to provide a method of detecting keystrokes on keys with a plurality of possible entries and determining the desired character of the user to be entered into the connected device.

Further objectives of this invention will be brought out in the following part of the specification, wherein detailed description is for the purpose of fully disclosing the invention without placing limitations thereon.

BRIEF DESCRIPTION OF THE DRAWINGS

FIG. 3(a) shows potentials generated between from communication between a contact and a contact pad on the printed circuit board when the key is depressed at its left side.

FIG. 3(b) is a graph showing scanned potentials.

FIG. 3(c) shows an example of data indicated on a display of the cellular phone.

FIG. 4(a) shows potentials generated between the contact and the contact pad when the key is depressed at its right side.

FIG. 4(b) is a graph showing scanned potentials.

FIG. 4(c) shows an example of data indicated on the display of the cellular phone.

FIG. 5(a) shows potentials generated between a contact and a contact pad when the key is depressed at its center.

FIG. 5(b) is a graph showing scanned potentials.

FIG. 5(c) shows an example of data indicated on the display of the cellular phone.

FIG. 14 is a flowchart showing the sequence for inputting characters using the data inputting unit of the related art.

FIG. 15(a) shows a potential which is generated each time a contact is touched to or detached from a contact pad on a printed circuit board.

FIG. 15(b) is a graph showing the scanned potential.

DETAILED DESCRIPTION OF THE INVENTION

Figure 1A:
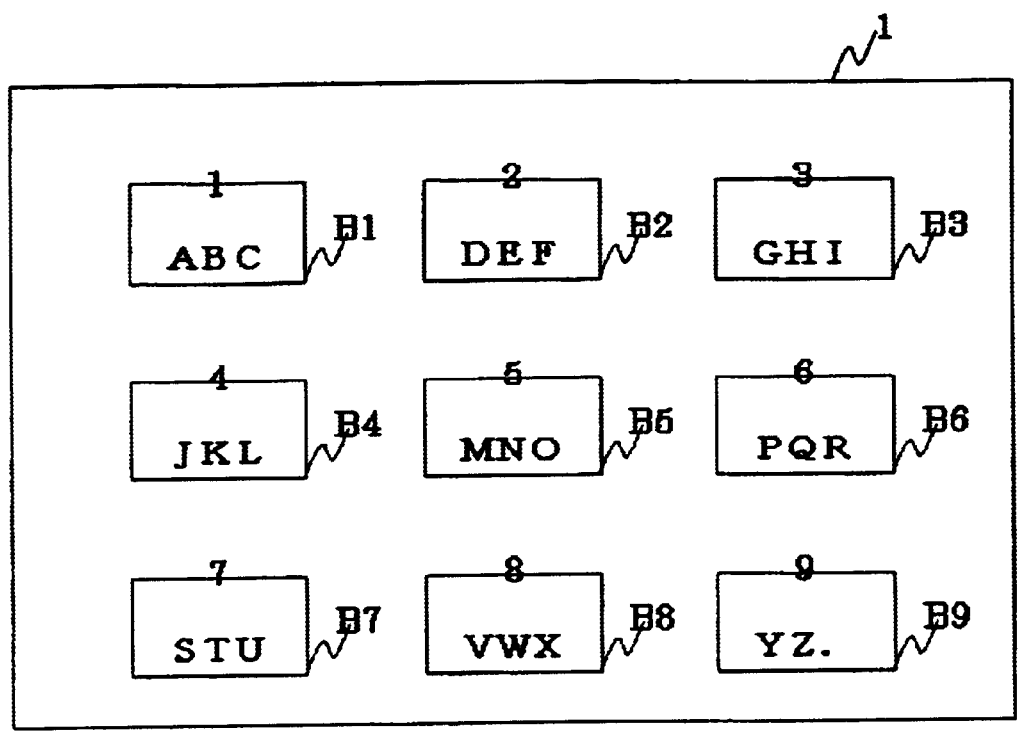
FIG. 1(a) is a front elevation of a key pad of a cellular phone used as a data inputting device according to the invention.

The invention will be described hereinafter with reference to the drawing figures. It is assumed here that a data inputting device of the disclosed invention is applied to a cellular phone in order to enter characters. The cellular phone is also provided with a data display. However, those skilled in the art will realize that other miniature computing and electronic devices requiring text and data input could benefit from the disclosed device and method herein and such is anticipated.

The data inputting device comprises a keyboard 1, contact pads provided on a printed circuit board 2 and corresponding to keys on the keyboard 1, a key depression detector, and a logic value generator. All the keys are biased away from the contact pads on the printed circuit board 2 using a biasing means such as a spring or having the keys attached to a flexible membrane (not shown). The keys are also tiltable in this biased engagement and this enables the keys to tilt to a number of positions when depressed on the left, right, center, top, or bottom.

Referring to FIG. 1(a), the keyboard 1 in the current best mode and to correspond to familiar existing keyboard forms, includes nine keys B1 to B9, each of which corresponds to three characters. Specifically, a total of 27 characters "A" to "Z" and a dot (.) can be entered using these nine keys. The characters corresponding to the individual keys are generally engraved on the keys B1 to B9. For instance, the key B1 carries characters "A", "B" and "C" from left to right engraved on its surface.

Figure 1B:
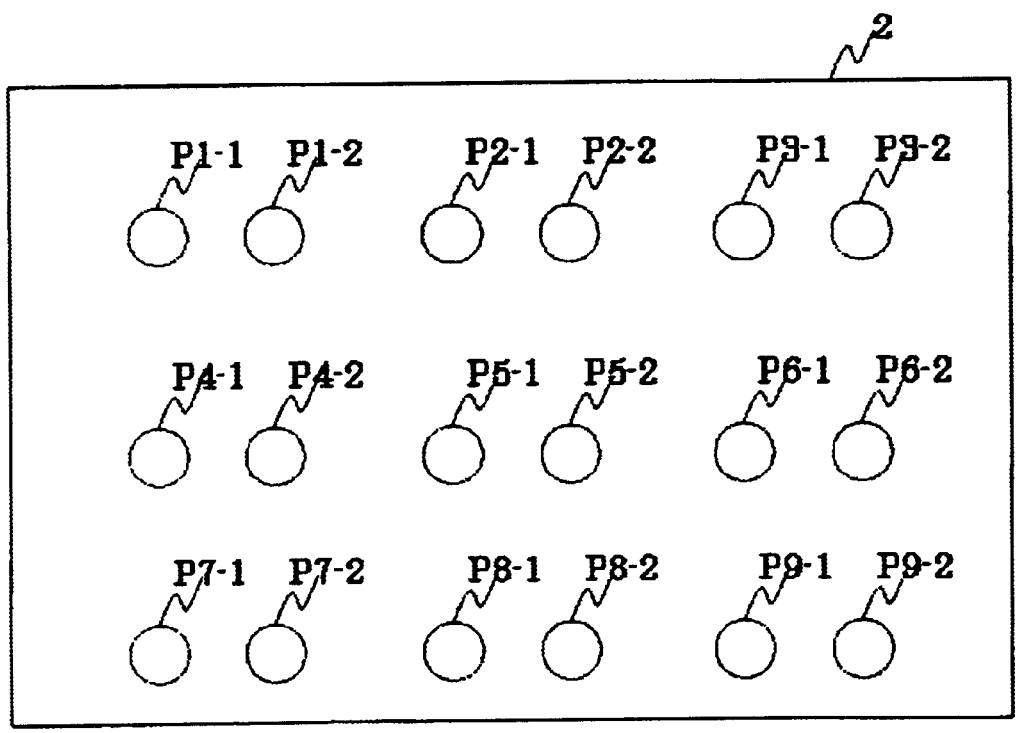
FIG. 1(b) is a front elevation of a printed circuit board.
Figure 2A:
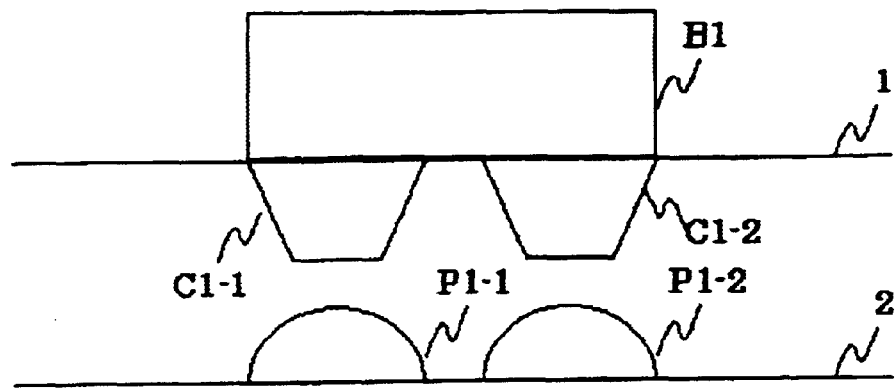
FIG. 2(a) is a side elevation of a plurality of contacts on the back side of the biased keys corresponding to contact pads on a printed circuit board, showing the key in an undepressed state.

FIG. 1(b) shows the printed circuit board 2 which is attached to a rear surface of the keyboard 1 and includes a total of 18 contact pads P1-1 to P9-2. Each of the keys B1 to B9 has two contacts C1-1 and C1-2 as shown in FIG. 2A on a rear side of the key facing the printed circuit board 2. The keys and keyboard 1 and the printed circuit board 2 are arranged substantially in parallel with each other and a sufficient distance apart such that they are out of contact with each other when no key is depressed and they are in communication with each other when a key is depressed. The keys are biased away from the printed circuit board 2 by conventional means to bias the keys such as a spring or being attached to a flexible membrane (not shown).

Figure 2B:
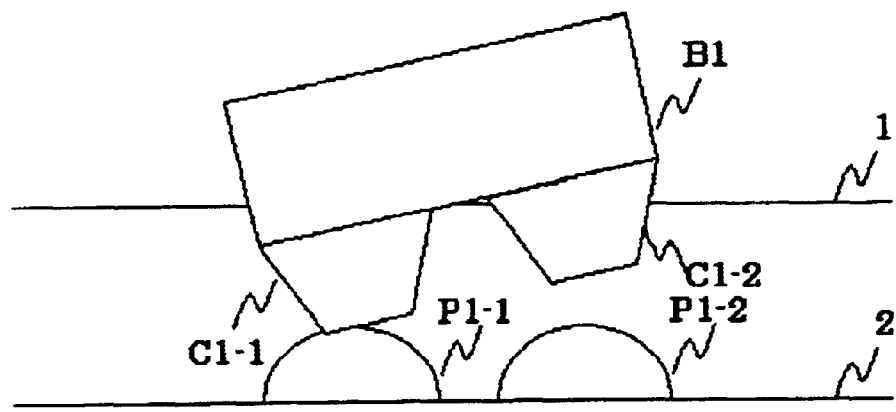
FIG. 2(b) is similar to FIG. 2(a), showing that the key is depressed and rotated to one side thereof by pressing on a side edge of the key.
Figure 2C:
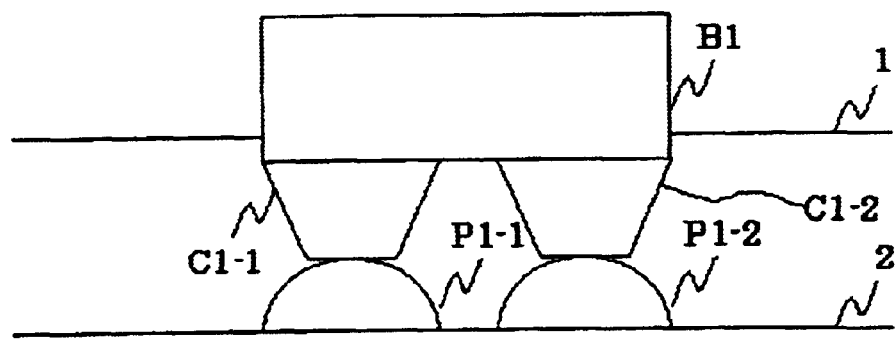
FIG. 2(c) is similar to FIG. 2(a), showing that the key is depressed at the center thereof.
Figures 6A, 6B:
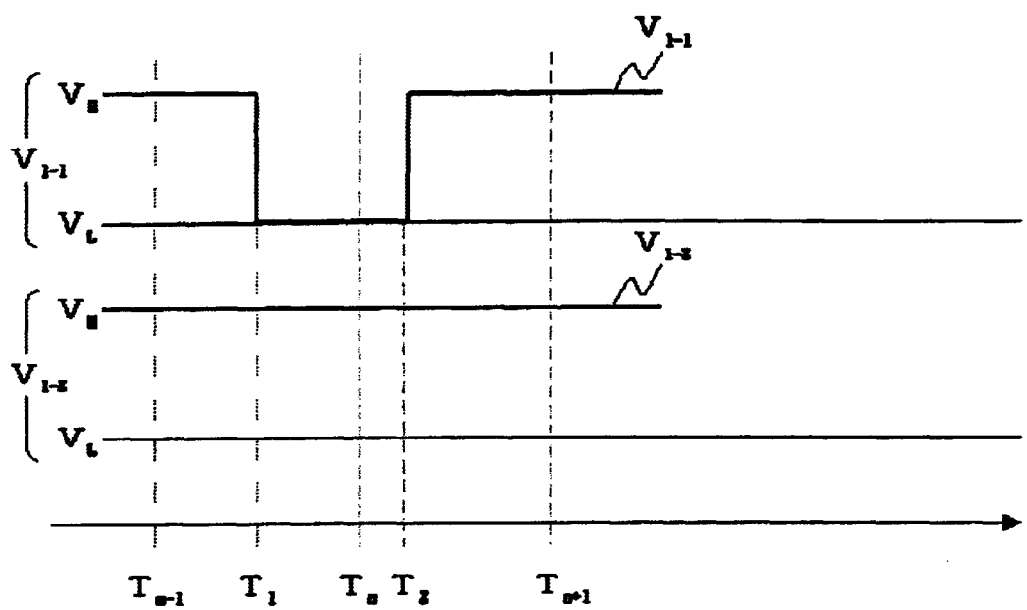
FIG. 6(a) shows potentials between a contact and a contact pad in a first example in which no key depression is detected.
FIG. 6(b) is a graph showing scanned potentials.
Figures 7A, 7B:
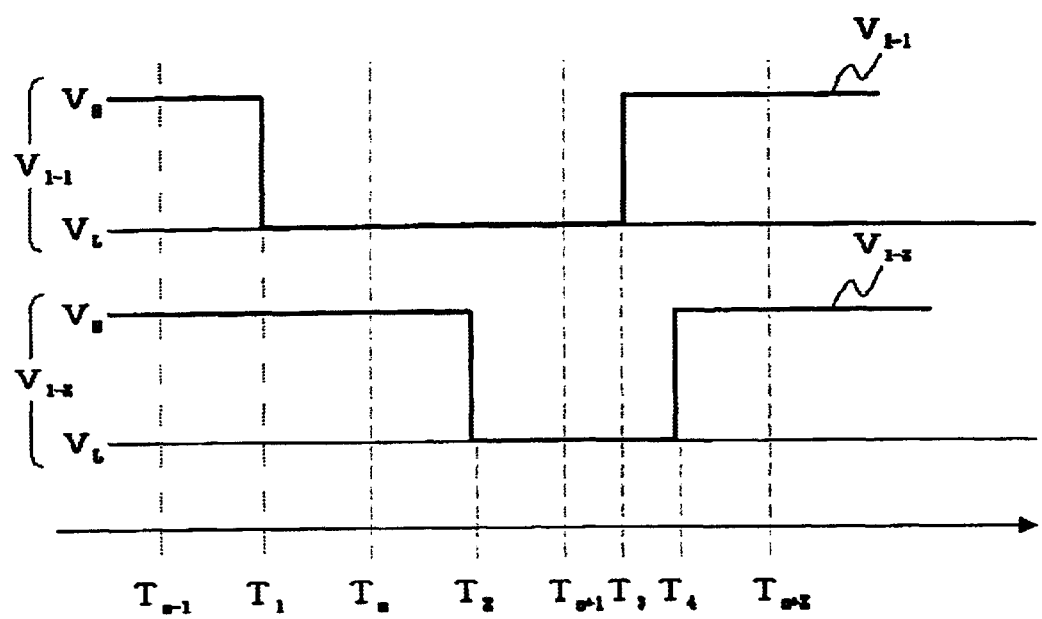
FIG. 7(a) shows potentials between a contact and a contact pad in a second example in which no key depression is detected.
FIG. 7(b) is a graph showing scanned potentials.
Figures 8A, 8B:
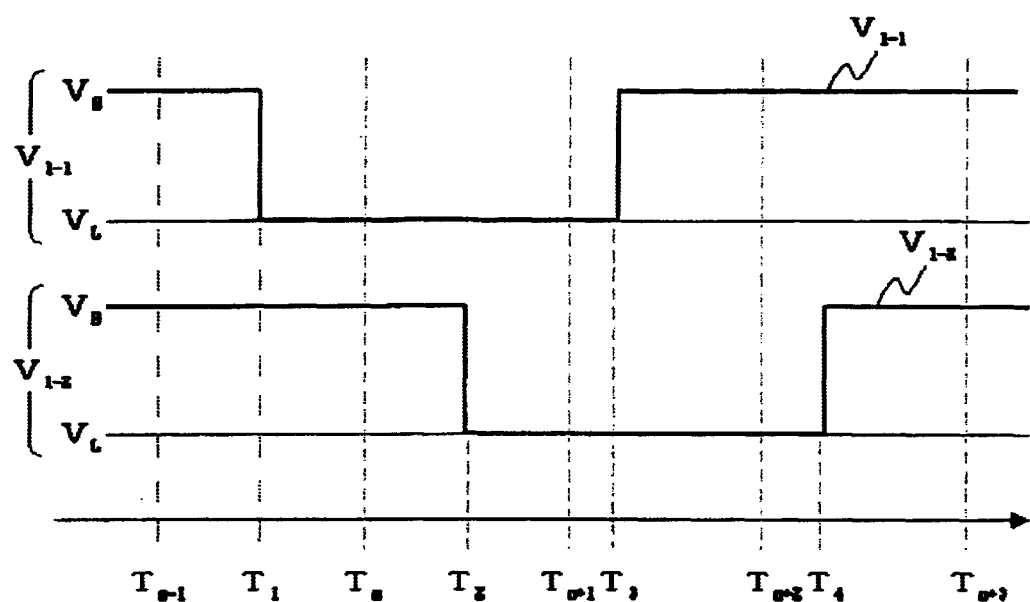
FIG. 8(a) shows potentials between a contact and a contact pad in a third example in which no key depression is detected.
FIG. 8(b) is a graph showing scanned potentials.
Figures 9A, 9B:
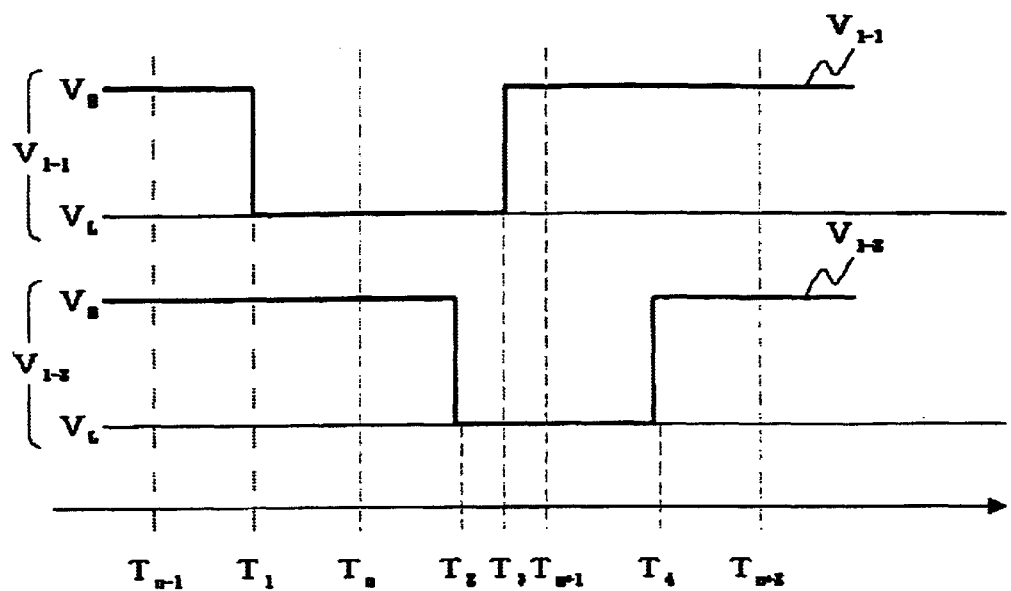
FIG. 9(a) shows potentials between a contact and a contact pad in a fourth example in which no key depression is detected.
FIG. 9(b) is a graph showing scanned potentials.

The key B1 is in the resting state as shown in FIG. 2(a) when it is not depressed, and is in a contact state as shown FIGS. 2(b) and 2(c) when it is depressed by the user sufficiently to overcome the bias away from the printed circuit board 2. As shown, the rear face of the key B1 has a plurality of contacts spaced apart and mounted thereon. When the key B1 is depressed at its left side (where the character "A" is present), i.e., a contact C1-1 of the key B1 is touched to the contact pad P1-1 as shown in FIG. 2(b) and would generate an "A". When the key B1 is depressed at its center, the contacts C1-1 and C1-2 are both touched to the contact pads P1-1 and P1-2 and would generate a different letter, that being "B". Although not shown, when the key B1 is depressed at its right side (where the character "C" is present), only the contact C1-2 is touched to the contact pad P1-2 thereby generating the letter "C".

In operation, data is inputted to the cellular phone or other connected device by depressing keys as described with respect to the data inputting in the related art shown in FIG. 14. The key depression resulting in a left-hand contact of only one contact and one contact pad, or a dual contact of both contacts and both contact pads, or a right-hand contact of only the other contact and other contact pad is detected in order to produce a logic value as follows, which differs from that of the related art.

The key depression detector, which is in electrical communication with the contact pads P1-1 and P1-2, periodically scans potentials which vary each time contacts are touched to or detached from contact pads on the printed circuit board 2. The depression detector detects the key depression on the basis of variations of the potentials at the contact pads p1-1 and p2-1. Specifically, the key depression detector detects the key depression on the basis of variations of the potentials which are scanned in two successive steps over a defined time duration. In other words, when the same result is obtained in these steps, the key depression detector detects the key depression. Conversely, if scanned results are not equal, a third step is carried out in order to scan the potentials. The result of the third scanning step is compared with that of the second scanning step. Thereafter, results of every two successive steps are repeatedly compared in order to confirm each key depression.

The results derived by each of the two steps are compared in order to prevent inaccurate data from being inputted by depressing wrong keys. According to the invention, each key is provided with at least two contacts C1-1 and C2-2 on a rear face, so that the logic values are generated on the basis of touching of the keys with the contact pads. Therefore, when the keys are small, wrong data may be inputted by depressing a very small key at a wrong part thereof.

Assuming for the sake of example that the user wishes to enter the letter "A" and is going to depress the key B1 in order to enter "A". However, if the user happens to depress the key B1 at the center thereof, the contacts C1-1 and C1-2 are touched to the contact pads P1-1 and P1-2. Thereafter, if the user depresses the key B1 at the left side thereof, the contact C1-1 is touched to the contact pad P1-1. In this state, logic values will be produced in response to the two key depressions, and a "B" and "A" will be entered.

If the user is going to depress the key B1 in order to enter "B" but happens to depress it at the right side thereof, the contact C1-2 is touched to the contact pad P1-2. Thereafter, even if the key B1 is re-depressed at the center thereof, the contacts C1-1 and C1-2 are touched to the contact pads P1-1 and P1-2. In this state, logic values will be produced in response to the two key depressions, and "C" and "B" will be entered.

The following describe how the key depression is detected on the basis of the results obtained by the two scanning steps, with reference to FIG. 3(a) to FIG. 9(b). In these drawing figures, V1-1 represents a potential produced between the contact C1-1 and the contact pad P1-1, and V1-2 represents a potential produced between the contact C1-2 and the contact pad P1-2. VH represents a potential which is present when no contact is touched to a contact pad, and VL represents a potential produced when at least a contact is touched to at least a contact pad. Further, Tn−1, Tn, Tn+1 and Tn+2 represent times at which the key depression detector scans the potentials V1-1 and V1-2 (i.e., Tn+2−Tn+1=Tn+1−Tn=Tn−Tn−1).

The character "A" is inputted by depressing the key B1 at the left side thereof, as described hereinafter. Referring to FIG. 3(a), it is assumed that the key B1 is depressed at the time T1 and is released at the time T2. (In an actual case, the potentials are unstable immediately after the depression or release of the key. In the present invention, the potential variations become stable at the times T1 and T2.)

Referring to FIG. 3(b), since the same potential is scanned at the times Tn and Tn+1, the key depression detector detects that the contact C1-1 is touched to the contact pad P1-1. The logic value generator produces a logic value for "A" on the basis of the detected result. Thereafter, "A" is indicated on the display 3, and thereafter the user hits an Enter key (not shown) in order to enter "A" and reset the depression detector. In this case, "A" may be indicated in a character window 4 of the display 3 in order that the user confirms the entered character.

The character "C" is inputted by depressing the key B1 at the right side thereof. Referring to FIG. 4(a), it is assumed that the key B1 is depressed at the time Tn and released at the time Tn+1, as described above. Since the same potential is scanned at the times Tn and Tn+1, the key depression detector judges that the contact C1-2 is touched to the contact pad P1-2, as shown in FIG. 4(b). The logic value generator produces a logic value for "C", so that "C" is indicated on the display 3. The user enters "C" by depressing the Enter key which again resets the depression detector. As shown in FIG. 4(c), "C" may be indicated in the character window 4.

The key B1 will be depressed at the center thereof in order to input "B". Referring to FIG. 5(a), it is assumed that the contact C1-1 and the contact pad P1-1 are touched to each other at the time T1 and are released from each other at the time T3, and that the contact C1-2 and the contact pad P1-2 are touched to each other at the time T2 and are released from each other at the time T4. Since the same potential is scanned at the times Tn and Tn+1, the key depression detector judges that the contact C1-1 is touched to the contact pad P1-1 and the contact C1-2 is touched to the contact pad P1-2, as shown in FIG. 5(b). The logic value generator in reaction to the scan produces a logic value for "B", so that "B" is indicated on the display 3. The user enters "B" by depressing the Enter key which will reset the depression detector. As shown in FIG. 5(c), "B" may be indicated in the character window 4.

The characters indicated on the display 3 are entered by the Enter key, or may be automatically entered after the lapse of a predetermined period of time. In other words, the user can correct an inputted character by re-depressing the same key within the predetermined period of time and before the enter key is pressed.

As described above, the key depression detector detects the key depression on the basis of the potentials scanned twice. Therefore, even when either the potential V1-1 or the potential V1-2 is scanned or even when both of these potentials are scanned, the key depression detector does not recognize the key depression until the scanned results are the same over the determined time duration.

When the key B1 is depressed once, the key depression detector recognizes the inputted character depending upon whether one or both of the contacts C1-1 and C1-2 is or are touched to one or both the contact pads P1-1 and P1-2. The logic value generator produces the logic value for the inputted character. Therefore, each character can be selectively entered by depressing any key once, which is effective in accelerating the character inputting.

Since the key depression is detected on the basis of the potentials scanned at a plurality of different times when the contacts are touched to the contact pads, it is possible to prevent erroneous inputting of characters. This is further effective in accelerating the character inputting. Alternatively, the potentials may be scanned and compared at three or more times should that be desirable.

When scanning intervals are shortened, the time for detecting the detection of key depression will be also shortened. However, if the key is depressed at a wrong position, the key depression may be detected before the key is re-depressed at a correct position. On the other hand, the longer the scanning intervals, the longer it takes to detect the key depression. In other words, it takes time to input characters. In such a case, even when a key is depressed at a wrong position, it can be depressed again at a desired position before the key depression is detected by the completion of the second scan during the defined time period.

The scanning intervals affect time periods to input characters. Experiments were performed using cellular phones having data inputting units of the present invention, with a scanning interval set to 0.1 second. The key depressions have been accurately detected during the experiments.

Each of the contact pads of the experimental cellular phones had a diameter of 2.0 mm which is smaller than a diameter (approximately 2.5 mm) of a contact pad of a cellular phone of the related art. Each key of the experimental cellular phones was as large as that of the cellular phone of the related art, and was provided with two contact pads. In other words, a contact pad of each experimental cellular phone was as large as that of the related art, and two contact pads were provided for each key.

Figure 10A:
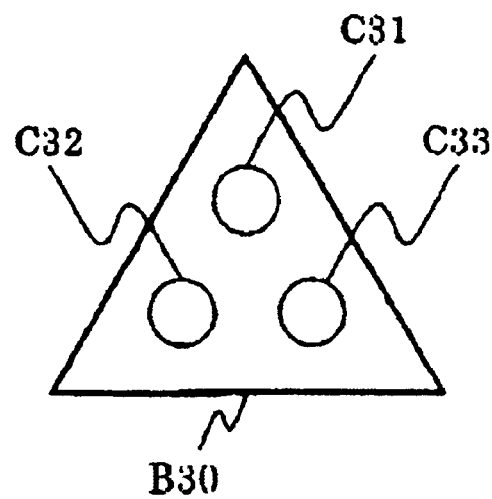
FIG. 10(a) is a bottom plan view of a key having three contacts on a rear face.
Figure 10B:
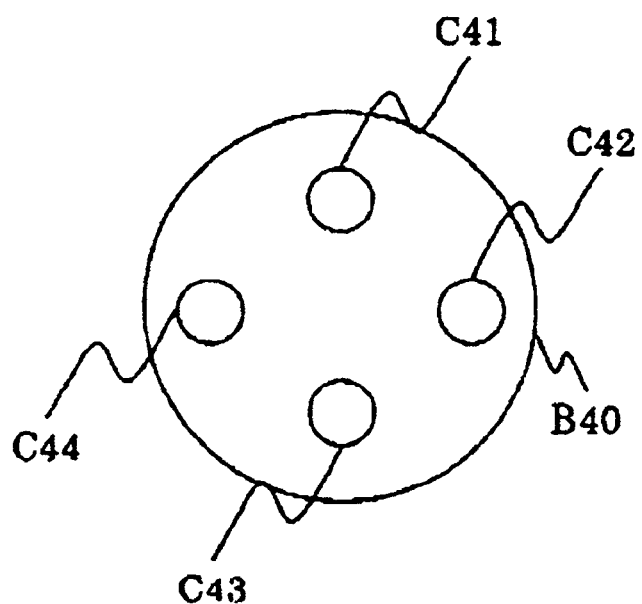
FIG. 10(b) is a bottom plan view of another key having four contacts on a rear face.
Figure 11:
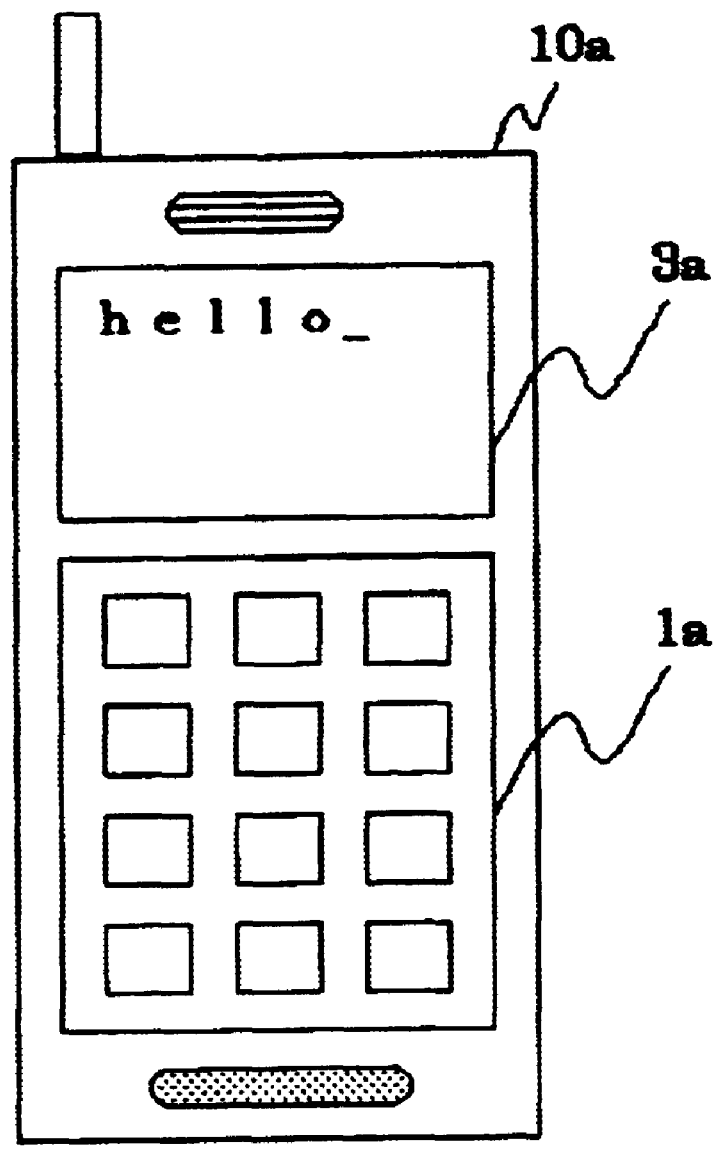
FIG. 11 is a front elevation of a cellular phone having a data inputting device of the related art.
Figure 12A:
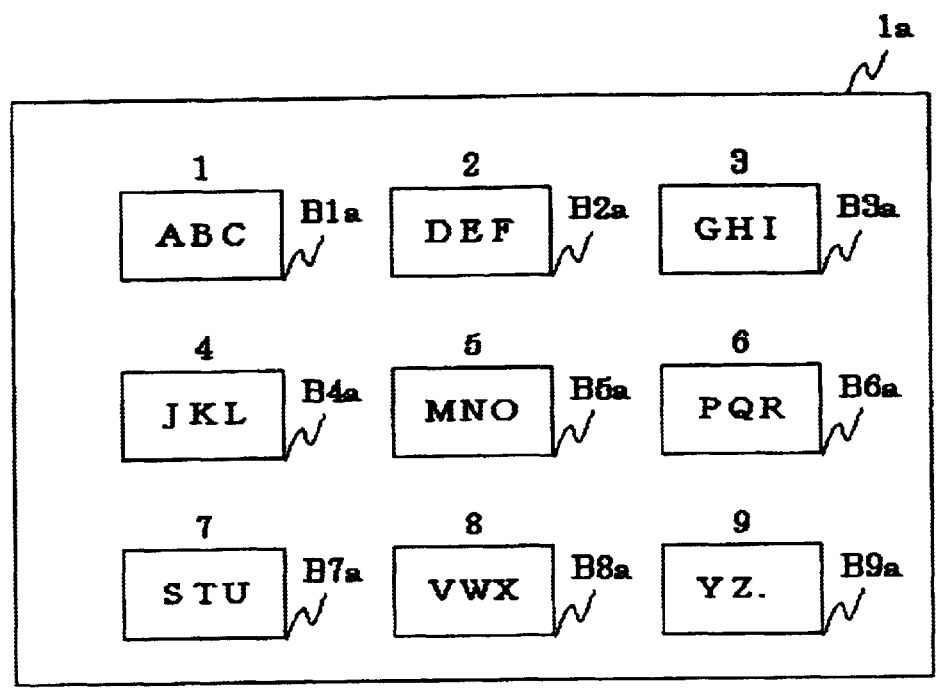
FIG. 12(a) is a front elevation of a contact pad of the cellular phone of FIG. 11.
Figure 12B:
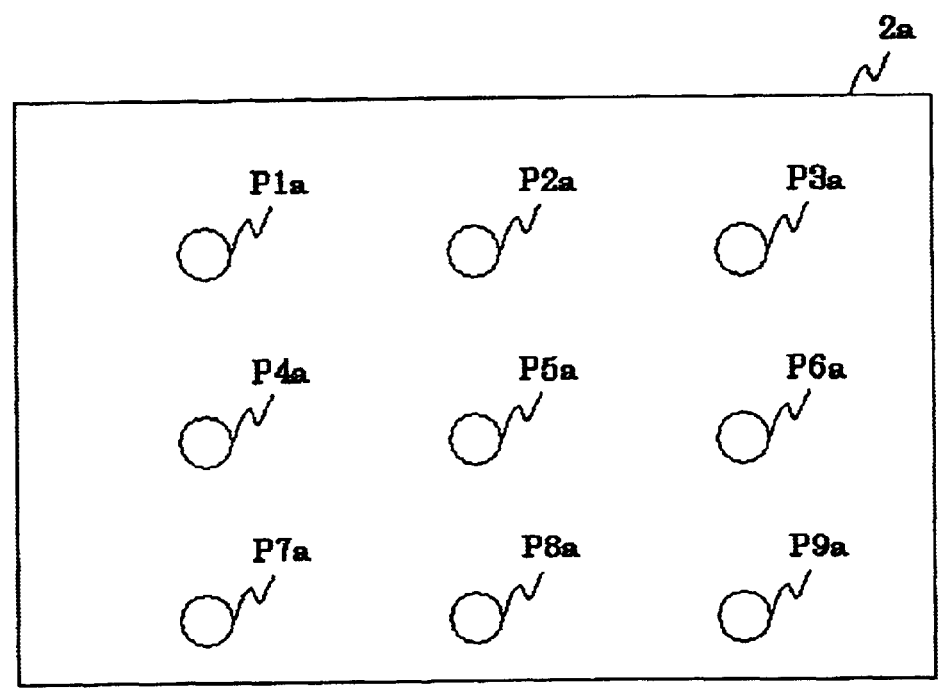
FIG. 12(b) is a front elevation of a printed circuit board of the cellular phone of FIG. 11.
Figure 13A:
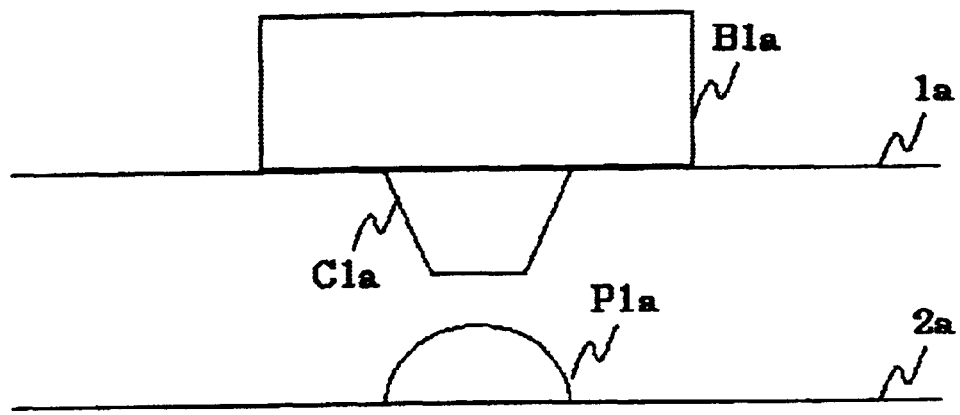
FIG. 13(a) is a side elevation showing the state in which a key is not depressed.
Figure 13B:
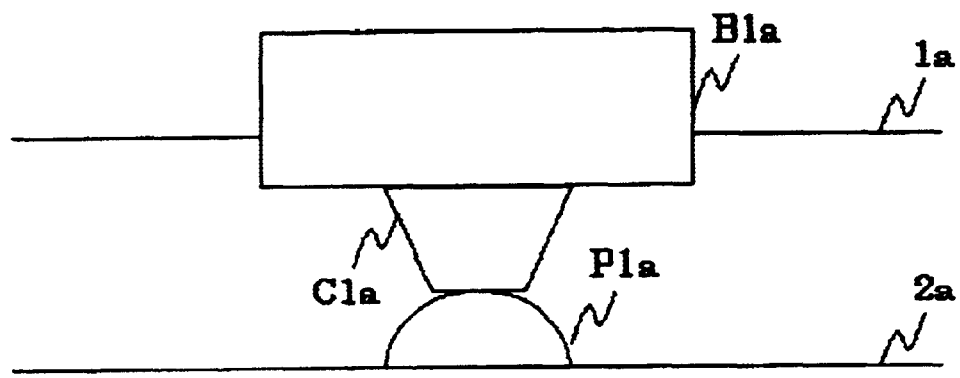
FIG. 13(b) is a side elevation showing the state in which the key is depressed.

According to the first preferred embodiment of the invention, each key has two contacts. Alternatively, each key may have three or more contacts on a rear face. FIG. 10(a) shows a key B30 provided with three contacts C31, C32 and C33 while FIG. 10(b) shows a key B40 having four contacts C41, C42, C43 and C44.

When the key B30 is used, the contacts C31, C32 and C33 are touched to contact pads in seven combinations depending upon what part or parts of the key B30 is or are depressed; only the contact C31; only the contact C32; only the contact C33; the contacts C31 and C32; the contacts C31 and C33; the contact C32 and C33; and the contacts C31, C32 and C33. In other words, one of seven pieces of data can be inputted by depressing the key B30 once. Further, one of nine different individual pieces of data can be inputted by depressing the key B40 only once.

As noted, the data inputting device and method herein is applicable to not only a cellular phone but also to other devices such as a keyboard of a personal computer or a remote controller of an electric appliance such as a television set or an air-conditioner which are used in order to input data assigned to each key. Such is anticipated.

Further, while all of the fundamental characteristics and features of this invention have been described herein, with reference to particular embodiments thereof, a latitude of modification, various changes and substitutions are intended in the foregoing disclosure and it will be apparent that in some instance, some features of the invention will be employed without a corresponding use of other features without departing from the scope of the invention as set forth. It should be understood that such substitutions, modifications, and variations may be made by those skilled in the art without departing from the spirit or scope of the invention. Consequently, all such modifications and variations are included within the scope of the invention as defined herein.

What is claimed is:

1. A data inputting device for use in combination with a device requiring data input comprising:

a plurality of keys;

said keys having a static position and a depressed position;

a plurality of contacts attached to each of said keys;

a plurality of contact pads, each of said contact pads corresponding to one of said plurality of contacts on each of said keys and communicates therewith when said key is in said depressed position;

a key depression detector communicating with each of said plurality of contact pads and detecting a key depression when one of said keys is moved to said depressed position once and at least one contact of said key is touched to at least one of said plurality of contact pads;

said key depression detector detecting said key depression by repeatedly taking a measurement of the potential of all of said plurality of contact pads and determining said key depression only when said measurement of said potential is equal in at least two successive measurements over a defined period of time; and a logic value generator communicating with said key depression detector and producing a logic value on the basis of a specific contact from said plurality of contacts brought into communication with a corresponding contact pad, wherein data corresponding to the logic value is inputted to said device requiring data input.

2. data inputting device of claim 1, wherein each key is provided with two contacts, and is depressed to input any one of three characters assigned thereto depending upon whether both or one of said contacts communicate with a corresponding contact pad.

3. A cellular phone provided with a data inputting device which comprises:

a plurality of keys;

said keys having a static position and a depressed position;

a plurality of contacts attached to each of said plurality of keys;

a plurality of contact pads each of which corresponds to one of said contacts attached to each key and and communicates therewith when said key is in said depressed position;

a key depression detector detecting a key depression when a key is depressed once and at least a contact thereof is touched to at least a contact pad;

said key depression detector detecting said key depression by repeatedly taking a measurement of the potential of all of said plurality of contact pads and determining said key depression only when said measurement of said potential is equal in at least two successive measurements over a defined period of time; and a logic value generator producing a logic value on the basis of the contact pad brought into contact with the contact, wherein data corresponding to the logic value are inputted.

4. The cellular phone of claim 3, wherein each key is provided with two contacts, and is depressed to input any one of three characters assigned thereto.

5. A method of inputting data comprising:

detecting a key depression when a key having two contacts is depressed and at least one of said two contacts is touched to at least one of two corresponding contact pads by repeatedly taking a measurement of the potential at both of said two contact pads and determining said key depression only when said measurement of said potential is equal in at least two successive measurements over a defined period of time; and producing a logic value for any one of three characters assigned to the depressed key, whereby data corresponding to the logic value are inputted.

6. A method of inputting characters using a cellular phone provided with a data inputting device and a data display, the method comprising:

depressing a key having two contacts on the data inputting device;

detecting a key depression when the key is depressed and at least of said tow contacts is touched to at least one of two corresponding contact pads by repeatedly taking a measurement of the potential of both of said two contact pads and determining said key depression only when said measurement of said potential is equal in at least two successive measurements over a defined period of time; and producing a logic value for a character assigned to the depressed key;

inputting data corresponding to the log value; and indicating the inputted character on the data display.

7. A data inputting device for use in combination with a device requiring data input comprising:

a plurality of keys;

a plurality of contacts attached to each of said keys;

a plurality of contact pads, each of said contact pads corresponding to one of said plurality of contacts on each of said keys and communicates therewith when said key is in said depressed position;

said keys having a static position wherein all of said plurality of contacts are separated from contact with said plurality of contact pads;

said keys having a first depressed position wherein at least one of said plurality of contacts communicates with at least one of said plurality of contact pads;

said keys having a second depressed position wherein at least two of said plurality of contacts communicates with at least two of said plurality of contact pads;

means to bias said plurality of keys to said static position;

a key depression detector communicating with each of said plurality of contact pads;

said key depression detector detecting a key depression when one of said keys is moved once to one of said first depressed position or said second depressed position by repeatedly taking a measurement of the potential of all of said plurality of contact pads and determining said key depression only when said measurement of said potential is equal in at least two successive measurements over a defined period of time; and a logic value generator communicating with said key depression detector and producing a logic value on the basis of said key moving to one of said first depressed position or said second depressed position wherein data corresponding to the logic value to one of said first depressed position or said second depressed position respectively, is inputted to said device requiring data input.

8. The data inputting device of claim 7 additionally comprising:

said plurality of contacts attached to each of said keys is two;

said keys having a first depressed position wherein at least a first one of said contacts communicates with at least a first one of said plurality of contact pads;

said keys having a second depressed position wherein at least a second one of said contacts communicates with at least a second one of said plurality of contact pads;

said keys having a third depressed position wherein said first one of said contacts communicates with said first one of said plurality of contact pads and substantially concurrently said second one of said contacts communicates said second one of said plurality of contact pads;

a key depression detector communicating with each of said plurality of contact pads;

said key depression detector detecting a specific key depression when one of said keys is moved once to one of said first depressed position or said second depressed position or said third depressed position by repeatedly taking a measurement of the potential of all of said plurality of contact pads and determining said key depression only when said measurement of said potential is equal in at least two successive measurements over a defined period of time; and a logic value generator communicating with said key depression detector and producing a logic value on the basis of said key moving to one of said first depressed position or said second depressed position or said third depressed position wherein data corresponding to the logic value to one of said first depressed position or said second depressed position or said third depressed position respectively, is inputted to said device requiring data input.

9. The data inputting device of claim 7 additionally comprising:

said plurality of contacts attached to each of said keys is three;

said keys having a first depressed position wherein a first one of said contacts communicates with a first one of said plurality of contact pads;

said keys having a second depressed position wherein a second one of said contacts communicates with a second one of said plurality of contact pads;

said keys having a second depressed position wherein a third one of said contacts communicates with a third one of said plurality of contact pads;

said keys having a fourth depressed position wherein said first one of said contacts communicates with said first one of said plurality of contact pads and substantially concurrently said second one of said contacts communicates and said third one of said contacts both communicate with said second one and said third one of said plurality of contact pads respectively;

said key depression detector communicating with each of said plurality of contact pads;

said key depression detector detecting a specific key depression when one of said keys is moved once to one of said first depressed position or said second depressed position or said third depressed position or said fourth depressed position; and a logic value generator communicating with said key depression detector and producing a logic value on the basis of said key moving to one of said first depressed position or said second depressed position or said third depressed position or said fourth depressed position, wherein data corresponding to the logic value to one of said first depressed position or said second depressed position or said third depressed position or said fourth depressed position respectively, is inputted to said device requiring data input.

* * * * *